July 15, 1930.                C. A. HILL                1,770,852
                         CONNECTING MEANS
                         Filed Nov. 12, 1928

INVENTOR
Charles A. Hill
BY
Swan Frye and Murray
ATTORNEYS

Patented July 15, 1930

1,770,852

UNITED STATES PATENT OFFICE

CHARLES A. HILL, OF PORT HURON, MICHIGAN, ASSIGNOR TO MUELLER BRASS CO., OF PORT HURON, MICHIGAN, A CORPORATION OF MICHIGAN

CONNECTING MEANS

Application filed November 12, 1928. Serial No. 318,727.

This invention relates to a method of securely uniting meeting pipe or rod ends with an encircling sleeve or coupling member and to the resultant construction as such, and has for its object an improved, more easily workable, stronger and more durable means of uniting such parts, even in field construction work and plumbing, and with limited equipment facilities, than has been the case with other heretofore known structures; with the provision of a firmness and an integration of the assembled parts which makes for durability and non-leaking characteristics of the structure thus formed. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the drawings.

Similar reference characters indicate corresponding parts throughout the several views of the drawings.

Figure 1:
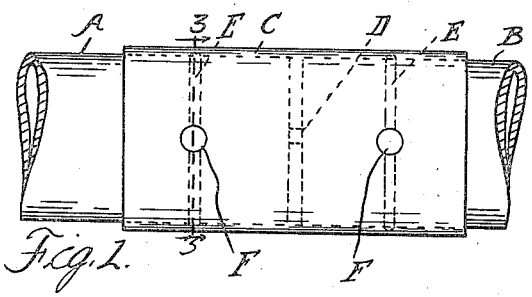
Fig. 1 is an elevation of a coupling, including a pair of pipes joined thereto.
Figure 3:
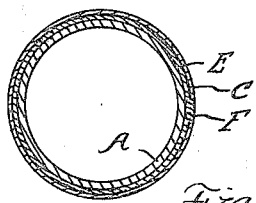
Fig. 3 is a cross section taken substantially on line 3—3 of Fig. 1.
Figure 2:
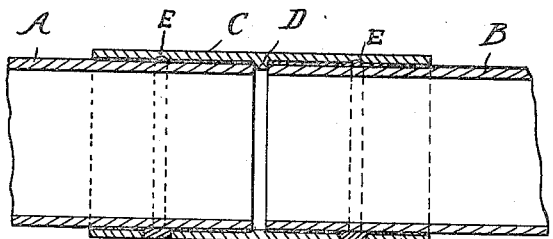
Fig. 2 is a longitudinal section of the coupling and pipes of Fig. 1.

Referring now more particularly to Figs. 1, 2 and 3, indicia A and B represent meeting pipe ends which are encircled by being slipped inside of a fairly loosely fitting sleeve or fitting C. From the middle portion of the interior surface of the sleeve C there preferably, though not necessarily, extends a stop projection or, if desired, an inner collar, D, by means of which the meeting pipe ends, as they are slipped within the sleeve D, may be positioned longitudinally in the sleeve. The collar C is provided with a pair of interior annular, or optionally spiral grooves E, into which access from the outside is had through holes F.

When the pipe ends are slipped into position within the sleeve C, liquid solder or other freely flowing uniting material is introduced into the holes F, and its travel completely around the pipe ends is facilitated by the presence of the grooves E. With these grooves filled up and the solder allowed to harden, a union amply strong for many purposes to which the pipe is adapted is effected between the pipe ends and the sleeve. However, I preferably provide the sleeve with an interior diameter a few thousandths of an inch greater than the exterior diameter of the entering pipe ends, so that the continued or overflowing movement of the solder beyond the bounds of the grooves E will be aided by capillary action between the sleeve and pipe walls in drawing a thin though filling film of the still liquid solder along the plain ungrooved surfaces. This flow may continue until the exuding solder appears beyond the ends of the sleeve and on the adjacent exposed surfaces of the pipes A and B, thereby establishing an indication that not only the grooves but all of the relatively thin space between the exterior faces of the pipe ends and the interior face of the sleeve has been filled with the fluid solder. The joint is thus established, and the solder, upon hardening, forms a secure and effective binding and connecting medium, possibly through alloying with and/or adhering to the pipes and fitting or telescoping members themselves.

Figure 4:
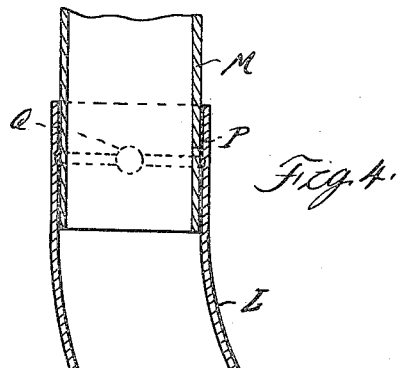
Fig. 4 is a view similar to Fig. 2, illustrating the application of the invention to an elbow; and, Fig. 5 is a view similar to Fig. 2 illustrating the application of the invention to a T.
Figure 5:
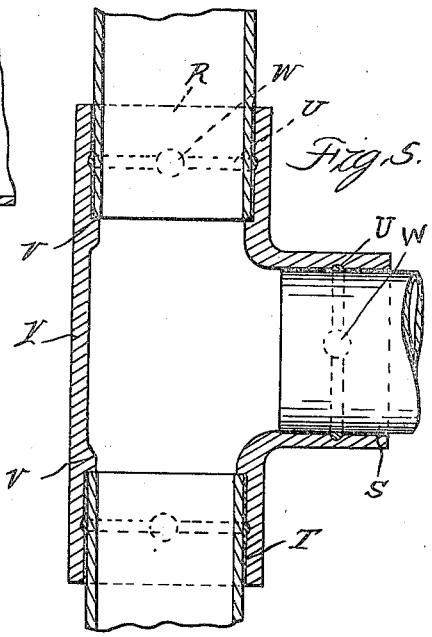

The manner of application of the invention to a 90° curve coupling or L wherein the entering pipe ends are appreciably spaced from one another is shown in section in Figure 4, wherein the entering pipe ends M and N are simply positioned within the desired part of the curved coupling L to the required degree, and the filling of the grooves P through the holes Q is proceeded with as already described. In the T coupling shown in section in Figure 5, the entering pipe ends R, S and T preferably, although not necessarily, abut against the stops V. For contrast of illustration I have shown the pipe ends R and T as thus blocked or limited in their inward movement, while the entering terminal S is shown free from obstruction by such a shoulder. As to each of these latter the solder is introduced into the groove U through the hole W in the manner described, thus uniting the several pipe ends with the T coupling Y.

It will of course be obvious that this method of connection could be adapted to the connection, in the manner described, of meeting rod ends instead of pipe or tube ends as described, without departure from the spirit of my invention.

A principal function of the grooves E is to facilitate the distribution of the introduced solder or other uniting medium about the pipe end. If the difference between the internal diameter of the sleeve and the exterior diameter of the pipe or rod ends is of the proper order, the spread of the liquid solder introduced through the holes F is brought about through capillary action between the enclosing surfaces, without any grooves being needed.

It is to be noted that the capillary action referred to is sufficient to cause spreading of the liquid solder regardless of the angle at which the joint is positioned.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A joint comprising, in combination, a fitting member, at least one member telescoping therewith, at least one of said members being tubular, said fitting and said member having therebetween an annular space which will cause capillary attraction on a liquid inserted in said space, said space being completely filled with an initially liquid connecting and sealing material which has been inserted by capillary action, and one of said telescoping members being provided with an exterior opening for the introduction of said sealing material.

2. A joint comprising, in combination, a hollow pipe fitting, at least one pipe telescoping therein, said fitting and said pipe having therebetween an annular space which will cause capillary attraction on melted solder inserted in said space, said space being completely filled with solder which has been inserted by capillary action, and said fitting being provided with an exterior opening for the introduction of said solder.

In testimony whereof I sign this specification.

CHARLES A. HILL.